(No Model.) 7 Sheets—Sheet 1.

L. K. JOHNSON & A. A. LOW.
APPARATUS FOR DISTRIBUTING TYPE.

No. 354,149. Patented Dec. 14, 1886.

Fig. 1.

(No Model.) 7 Sheets—Sheet 4.

L. K. JOHNSON & A. A. LOW.
APPARATUS FOR DISTRIBUTING TYPE.

No. 354,149. Patented Dec. 14, 1886.

(No Model.) 7 Sheets—Sheet 5.

L. K. JOHNSON & A. A. LOW.
APPARATUS FOR DISTRIBUTING TYPE.

No. 354,149. Patented Dec. 14, 1886.

(No Model.) 7 Sheets—Sheet 6.

L. K. JOHNSON & A. A. LOW.
APPARATUS FOR DISTRIBUTING TYPE.

No. 354,149. Patented Dec. 14, 1886.

Witnesses:
William A. Pollock
W<u>m</u> Gardner

Inventors:
Louis K. Johnson
A. Augustus Low,
By their attorney
Geo. W. Miatt N. PETERS, Photo-Lithographer, Washington, D. C.

(No Model.)  7 Sheets—Sheet 7.

L. K. JOHNSON & A. A. LOW.
APPARATUS FOR DISTRIBUTING TYPE.

No. 354,149. Patented Dec. 14, 1886.

UNITED STATES PATENT OFFICE.

LOUIS K. JOHNSON AND A. AUGUSTUS LOW, OF BROOKLYN, ASSIGNORS TO THE ALDEN TYPE MACHINE COMPANY, OF NEW YORK, N. Y.

APPARATUS FOR DISTRIBUTING TYPE.

SPECIFICATION forming part of Letters Patent No. 354,149, dated December 14, 1886.

Application filed February 24, 1885. Serial No. 156,604. (No model.)

*To all whom it may concern:*

Be it known that we, LOUIS K. JOHNSON and A. AUGUSTUS LOW, citizens of the United States, residing in the city of Brooklyn, in the county of Kings and State of New York, have invented certain new and useful Improvements in Apparatus for the Distribution of Type, of which the following is a specification.

Our improvements relate to that class of type receiving and distributing apparatus in which the types are dropped by hand and by which they are arranged in prescribed positions in containing-channels which are adapted for use in the setter-case.

One object of our present invention is to produce an apparatus that may be adapted readily to the reception and distribution of varying sizes and styles of types—say, for instance, from diamond up to pica—and in which all tendency of the types to follow the pusher or forwarder backward during its retractile movements is counteracted by positive means without injury to the types. In this connection reference may be had to our pending applications, Nos. 78,535, 131,261, and 144,776, in which the general construction and operation of our special form of duplex bank apparatus is more fully described than is deemed necessary herein, although some of our improvements are especially adapted thereto.

In order to attain any advantageous degree of speed and accuracy in the distribution of any given style of type in this class of apparatus, it is essential that the parts should bear certain definite relations to each as to position, varying somewhat for different fonts of types. In other words, the adjustment of the several parts of the apparatus that is called for to conform to a change in the types to be distributed is not always uniform and progressive, but may require little or no change in the position of some parts, while others may require considerable alteration in order to properly control the types. For instance, while the corresponding characters in a number of fonts of type of the same class, as small pica, will all be of the same "width on the flat," they may vary considerably in face, and consequently in thickness of body, especially in the case of fancy designs, so that it may be frequently desirable to vary the adjustment for individual characters as compared with like characters in other fonts of the same class; but when the varying thicknesses of the individual type in a single font alone are considered, the desirability of independence in adjustment is still more apparent.

Heretofore, so far as we are aware, no adequate provision has been made for regulating the area of each type-conduit independently, and so as to just allow the passage of its particular denomination of type. To provide for all these varying conditions, and to enable us to control the descent and transfer of the various types into their respective containing or "setter" channels with perfect accuracy and delicacy, we construct the bed-plate, which supports the setter-channels, the conduit-plate, and the sides and the floors of the conduits all so that they are relatively and independently adjustable, substantially in the manner hereinafter set forth. Taken in conjunction with these features of adjustment, and as a means of insuring the benefits thereby attained by supplemental action, our new feature of providing means for the positive prevention of back vibration or movement of the latest types during the retractile movement of the pusher is of importance.

Heretofore reliance has been had upon the inclination imparted to the containing or setter channels, which inclination has been such with relation to the horizontally-vibrating pusher and the ends of the conduits that the types when raised into a perpendicular position within the containing-channels by the pusher have always had their centers of gravity carried beyond the vertical line, so as to cause them to rest naturally against the next preceding type in the channel; but in practice it sometimes happens, owing to the smallness of the types under distribution or to imperfection in the preparatory cleaning process to which they are required to be subjected, that the latest distributed types have a tendency to vibrate back and forth with the pusher. Another cause of such back vibration is the spring or elasticity that may exist in the columns of type in the containing-channels, owing to the impaired curved form of some of the types.

This curvature is liable to occur in use of thin types, and especially in spaces, while justifying, and though slight when taken singly is sufficient, when a number of such bent types occur in a column to interfere with their desired perpendicularity, and to impart sufficient elasticity to the columns to cause the types to follow the pusher during its retractile movements. The last types are thus not only subject to the danger (especially in the case of thin types) of turning upon their longitudinal axes, but of also having their faces exposed more or less within the path of the heels of subsequently descending types. Aside from any injury that might thus be caused to the faces of the types, such collision is apt to produce derangement and clogging, thereby causing delay and inconvenience. We effectually overcome these dangers and positively preserve the perpendicular position of the types within their containing-channels after they have once been raised therein by the vibrating pusher, by means of one or more elastic latching or re-enforcing devices which yield to the advance of the types, but which either close behind them or press against them with sufficient force to sustain them until they are in turn forwarded by the advance of the next succeeding types. It is obvious that various forms of such devices may be used, as, for instance, articulating mechanism, which will alternately recede before and advance behind the pusher; but for simplicity we prefer to utilize either the elasticity of springs or simple gravity to cause such devices to re-enforcing and sustaining the types, and to allow the latter directly to bear upon them and cause them to recede during the advance of the pusher.

In the present application this part of our invention consists in the use of independent lateral latches or holders arranged in each type-channel, which, while allowing the types to press forward therein, prevent their return and hold them steady in the channels by applying a lateral side pressure to their bodies. In this connection we show an alternative or auxiliary mode of preventing the retractile movement of the types, consisting in extending over a series of channels and arranged to allow the types to pass underneath while they are being forwarded by the pusher, and then to oppose their return or vibration; but we do not seek to claim such construction herein.

While both the top and lateral type-retainers act in harmony and conjunction to properly hold and sustain the types against undue motion or turning, it is obvious that in some cases either may be used independent of the other, as where the types to be distributed are of comparatively large size; but for the smaller sizes of type it will be preferable to use both means. These lateral latches or type-supports are not only to be used for receiving and securing the types as they are raised and forwarded by the pusher, but are also designed to be used at additional points along the type-channels, for the purpose of taking up all looseness or play in the columns throughout their entire length, no matter whether the latter be great or small; hence the lateral holder may be formed either in the side of the channels themselves, or may be made independently, so as to engage therewith, or they may be attached to the space rods or bridges which rest upon the tops of the channels.

An important feature of our invention in this connection also consists in the provision of a series of primary receiving or transfer typeways intermediate between the lower ends of the receiving-conduits and the receiving ends of the containing or setter channels. Where the apparatus is designed only for the distribution of a single size of type, these intermediate type-channels may be permanently affixed to the bed-plate; but when the apparatus is intended for the distribution of different sizes and varieties of types such intermediate channels are either made in interchangeable series, each of which is adapted in width to a different size of type, or one of the side walls of each of said intermediate channels is made adjustable to accomplish the same result. Where the interchangeable series of channels are employed, the conduit-walls in the conduit-plates are permanent, the conduits being made of the maximum width, and the corresponding ends of those intermediate channels which are adapted to the smaller sizes of types being flared or beveled, so as to connect with and form continuations of the side walls of the conduits. By the use of these series of interchangeable intermediate channels the adjustment of the apparatus to different sizes of types is quickly effected, while the construction is simple and inexpensive; but the same result may be attained without the use of detachable parts by making one of the side walls of each of such primary or transfer channels adjustable, to conform to and coincide with the said walls of any of the different widths of setter-channels which may be required for use upon the bed of the apparatus. This part of our invention includes means for effecting such adjustment of the side walls simultaneously throughout the series of intermediate type-channels.

Still another feature of our invention consists in an adjustable end rest or shoulder upon each bed-plate of the apparatus, by which the inner ends of the setter or containing channels may be pressed against the outer ends of the intermediate channels or against the ordinary steps or shoulders under the conduit-plates, where the transfer-channels are not used, thereby locking the said setter-channels thereon.

We also employ a new form of guard near the lower end of the conduit-plate, upon the right-hand side of the receiving-bank, which is adjustable vertically thereon to afford greater accuracy in controlling the descending types upon that side of the apparatus. We provide for the rapid withdrawal of the left-hand receiving-plates from the left-hand conduit-plate by forming their standards with rack-teeth which are acted upon by gears mounted upon a common shaft, which is rotated by means of a suitable crank-key. We are thus enabled to move the receiving-plates evenly and conveniently to and from the conduit-plate, in order to gain access to the latter or parts beneath, or when it is desired to raise the superposed receiving-plates themselves one from the other. This latter operation may be readily accomplished, since they are simply held in position individually upon and between the standards by gravity alone, shoulders being formed upon the plates, which engage with projections upon the standards in such manner that the plates are at all times free to be raised vertically. A series of space-boxes are also mounted between the receiving plate standards in such manner as to form a continuation of the receiving area, being thus in the most advantageous position for the convenient deposition of the numerous "spaces" invariably present in all composition.

Upon the right-hand side of the duplex receiving-bank, which, as set forth in previous applications, is devoted to the reception of the least-frequently used denominations of type, and in which such types have heretofore been deposited directly between the upper side walls of the conduits, we arrange a series of receiving funnels which gradually contract into and coincide with certain of the conduits in the plate. As the conduits are arranged close together with party walls, they cannot all be thus provided with these laterally-enlarged throats, and a certain number are therefore selected — say every third or fourth in the row — thus increasing the receiving-area for certain types in that proportion. By devoting these enlarged receivers to the reception of the most-frequently occurring types for that side of the receiving-bank we facilitate distribution, while the remaining characters are deposited in the intermediate conduits in the same way as heretofore. Each of these enlarged receivers is so contracted at or near its point of junction with its particular conduit that a type cannot pass through unless upon its "flat" side, and their upper side walls are inclined so as to trip or turn any types that may accidentally rest upon their edges.

Another feature of our invention relates to the construction of the receiving-plates upon the left-hand side of the duplex receiving-bank, and consists in forming the receivers and channels of sheet metal, struck up and attached to plates of wood or other comparatively light material, substantially as herein set forth.

Figures 4, 5, 6, 7, 8, 9, 10, 11, 12:
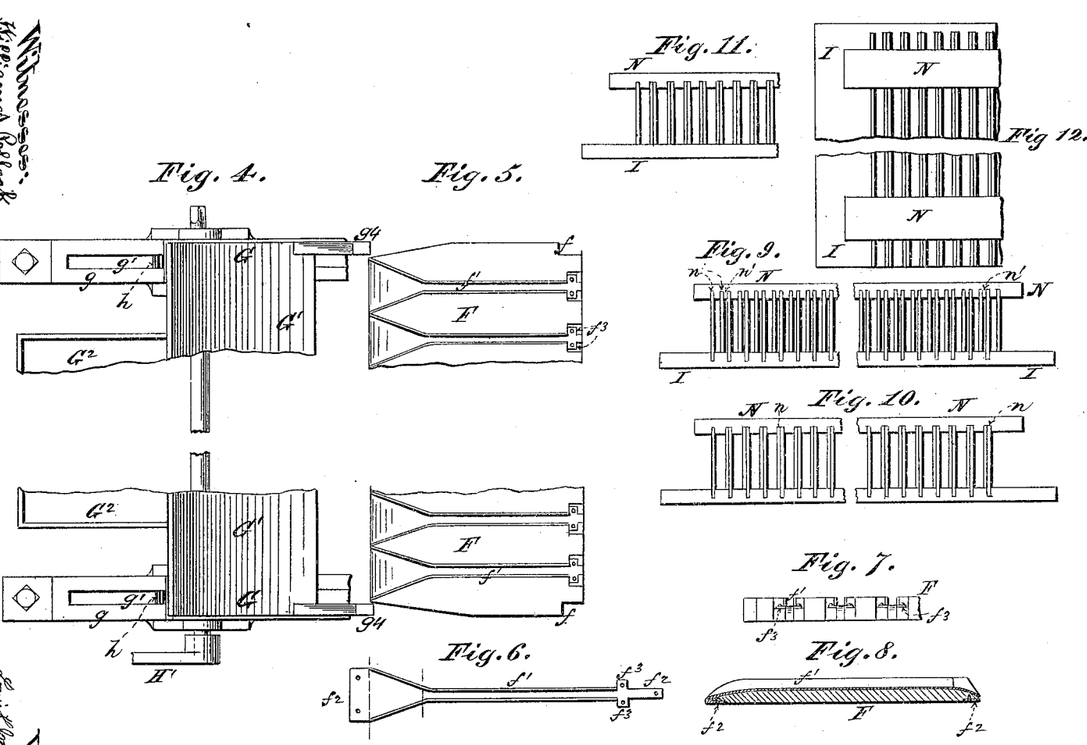
Fig. 4 is a plan view of the standards for the support of the superposed receiving-plates with the central portion of the connecting web broken away.
Fig. 5, a plan of the extremities of the lowest and largest of receiving-plate, showing the engaging shoulders and the sheet-metal receivers.
Fig. 6 is a plan of one of the sheet-metal receivers before application to its plate.
Fig. 7, an edge view of the lower portion of one end of a receiving-plate, showing sheet-metal receivers in position.
Fig. 8, a longitudinal section through one of the sheet-metal receivers when secured to its plate.
Fig. 9 represents an end elevation of the bed-plate with the central portion broken away, provided with type-channels, one side of each of which is stationary thereon, while the other is movable, the width of the channels in this view being shown as contracted for a small size of type, while the space thus left between the channels is compensated for by the space-stick or bridge engaging with the upper side walls of the channels.
Fig. 10 is a similar view in which the channels are shown at their greatest width with their adjoining side walls in contact.
Fig. 11, a similar view of a portion of the bed-plate upon which rest type channels, all the side walls of which are movable, being held in position thereon by the spacing stick or bridges.
Fig. 12 is a plan of portions of opposite ends of the bed-plate upon which rest the movable type-channel walls, and showing the space-sticks at both extremities thereof.
Figure 13:
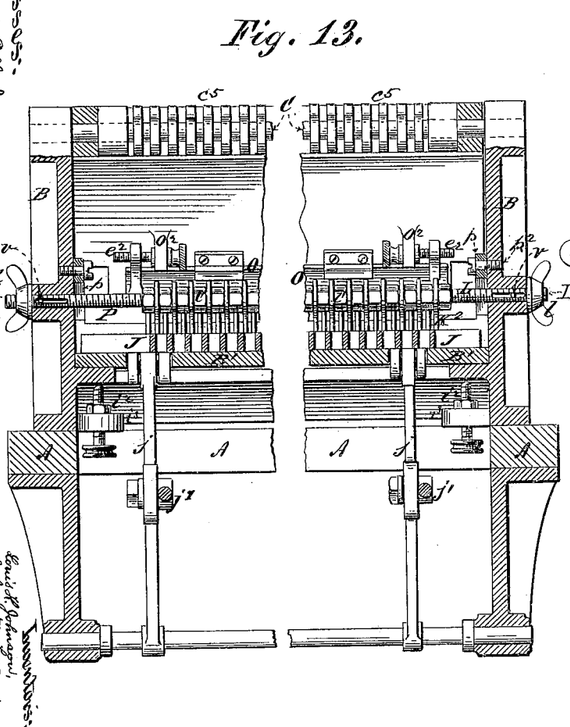
Fig. 13 is a vertical sectional elevation taken near the longitudinal center of the duplex receiving-bank, the central portion of the apparatus being broken away.
Figure 14:
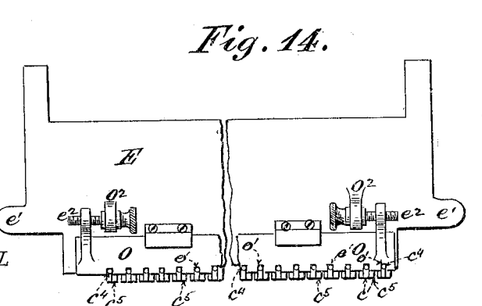
Fig. 14 is a rear view of the left hand conduit-plate with its central portion omitted, showing a means of effecting the adjustment of the movable side walls of the conduits.
Figures 15, 16:
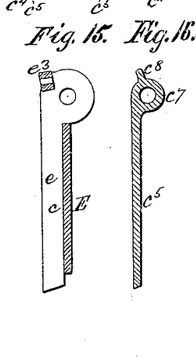
Fig. 15 is a detail section through one of the conduits in the left-hand conduit-plate.
Fig. 16, a longitudinal section through one of the adjustable floors for the conduits.

Finally, our invention consists in the provision of what may be designated as "spacing sticks" or "bridges," which rest upon the tops of the type channels, and are formed with series of notches or grooves in their under side which receive and hold steady the side walls of the said type-channels, thereby insuring their uniformity and regularity of position upon the bed of the apparatus. By the use of these spacing sticks or bridges the system of type channels herein described, in which one of the sides of each channel is movable, is rendered practicable. In fact, by their use both sides of the channel may be movable, the channels consisting simply of strips of suitable material resting on edge upon a perfectly smooth and level bed or table, and being held together at top by a suitable number of the space sticks or bridges, as indicated in Figs. 11 and 12.

In the accompanying drawings.

The apparatus is mounted upon a suitable frame-work, the horizontal members A of which only are represented in the drawings. At or near the center of the supporting-frame, upon opposite sides, are secured the vertical standards B B, connected at top by the rod C. This rod C serves as the axis or support from which both the right and left-hand conduit-plates, D E, are suspended between the standards B B. Being thus pivotally supported at their point of conjunction, the conduit-plates D and E are free to rest against and conform to the adjustment of the set-screws or rests $d$ $e$, which project from suitable lugs, $b$ $b'$, upon the standards B B, or other stationary part of the apparatus. As shown in the drawings, lugs or flanges $d'$ $e'$ are also formed upon the sides of the conduit-plates D E, to afford suitable contacts for the set screws $d$ $e$, although it is obvious that the inclination of the conduit-plates D and E may be effected by other means than the particular devices represented. By thus making the lower edges of the conduit-plates adjustable with relation to the vibrating pusher J we are enabled to dispense with the adjustable pusher fingers or combs upon the latter, using simply a double comb formed in a single piece, since any variation in the inclination of either of the plates will expose the types upon that side more or less to the thrust of the pusher, as may be desired. The delicacy and convenience of the adjustment thus attained render it preferable in some respects to that obtained by the independent combs upon the pusher, as heretofore. Any change in the height of the lower ends of the conduit-plates thus brought about may be readily compensated for by correspondingly raising or lowering the inner ends of the channel-bed plate I by means of the adjustable supports $i^2$ $i^2$.

The receiving-plates F for the left-hand conduit-plate, E, are supported upon and between movable standards G G, as in our last application for patent; but in this case provision is made for moving the plates and standards simultaneously upon both sides by a single device, thus securing uniformity and ease of motion with greater convenience. To effect this the standards G G are mounted upon horizontal ways $g g$, which are slotted ($g'$ $g'$) longitudinally to admit the ribs or racks $g^2$, projecting from the under side or base of each standard G. These ribs $g^2$ are formed with rack-teeth, which engage with gears $h$, mounted upon the horizontal shaft H, which extends across the apparatus, and is supported in suitable bearings upon the horizontal members A of the frame. The shaft H projects slightly beyond its bearings at one or both ends, and is shouldered so as to engage with a removable crank-key, H', or other similar device for imparting motion to the gears $h$ $h$. By this means the superposed plates F may be quickly advanced to or retracted from the left-hand conduit with an even and uniform motion throughout.

The receiving-plates F F are each formed with one or more offsets or shoulders, $f$ $f$, at either extremity, which, when the plates are in position upon the standards G G, rest against upwardly-projecting posts $g^4$ $g^4$, springing upward from the inclined bearing-surfaces of the said standards.

By reference to Figs. 1, 2, and 4, 5 it will be seen that since the shoulders $f$ $f$ upon the plates engage the posts $g^4$ $g^4$ only upon their upper sides, the plates can be raised and removed vertically, or nearly so, even, if desired, without first withdrawing them from contact with the conduit-plate. By this construction, which is simple and inexpensive, the superposed plates may be quickly and conveniently removed for purposes of cleaning, &c., and as readily dropped into place again, where they are held by their own weight alone.

The plates F are substantially the same in construction and arrangement as those described in our previous applications for patent, four being shown in the present case, so that the receiving-passages in each particular plate coincide with every fourth conduit in the conduit-plate D; but in the present case we construct the plates F of wood, or some other comparatively light material, and form the type-receiving passages out of sheet metal, stamped or struck up into the proper form, and then secured in proper position upon the plates. This construction is illustrated in Figs. 5, 6, 7, and 8, in which the sheet-metal blanks $f'\,f'$ are shown as countersunk into the plate F. Fig. 6 shows a top view of the blank $f'$ ready for attachment to the plate. When applied to the latter, the ends $f^2\,f^2$ of the blank are turned underneath and secured to the under side of the plate, while the lateral lugs $f^3\,f^3$ are secured to the front of the plate.

If preferred, each plate may be struck up entire out of sheet metal, suitable shoulders, &c., being formed in the process to properly space and support the plates with relation to each other. A receiving plate thus constructed is light and inexpensive, as compared with a cast-metal plate, in which the type-receiving grooves have to be carefully "finished."

Projecting from the web or plate G', which connects the standards G G, is a horizontal bracket or shelf, $G^2$, which affords a support for a suitable number of receptacles for the reception of spaces, italics, &c. These space-boxes F' are of such height that their tops are about on a level with the upper edge of the receiving-plates F F. This arrangement brings the space-compartments into the most convenient and appropriate position with relation to the hand of the distributer. It also provides for their quick removal and substitution, as they are intended simply to rest loosely upon the supporting shelf $G^2$.

The bed-plates I, for the support of the type-containing channels, are inclined as heretofore, but are not rigidly affixed to the frame A. Their outer and lower extremities, $i$, rest against a suitable step or shoulder, $i'$, upon the frame A, while their inner or raised ends are supported by adjustable devices $i^2\,i^2$, secured to the stationary parts of the apparatus. In the drawings these adjustable supports are shown as consisting of set-screws passing through lugs $i^3\,i^3$, projecting from the bottom of the standard B. The adjustment thus provided for enables us to regulate the distance between the lower edges of the conduit-plates and the surfaces upon which the heels of the types descend therefrom with accuracy.

Resting upon a horizontal support or shelf, B', extending between the standards B B, under the conduit-plates D and E, is the horizontal reciprocating pusher J, actuated substantially in the manner set forth in our previous applications before referred to, the vibrating lever $j$, the bifurcated upper ends of which engage with pins upon the under side of the pusher, being actuated through the connecting-rods $j'$ by suitable cranks or eccentrics upon a prime shaft situated underneath the apparatus. This pusher, which is simply of the plain double-comb pattern made in one piece and heretofore used, forwards the types as fast as they descend from the conduit-plates into the receiving ends of the type-channels upon the inclined bed plates I, in the usual way.

Figure 27:
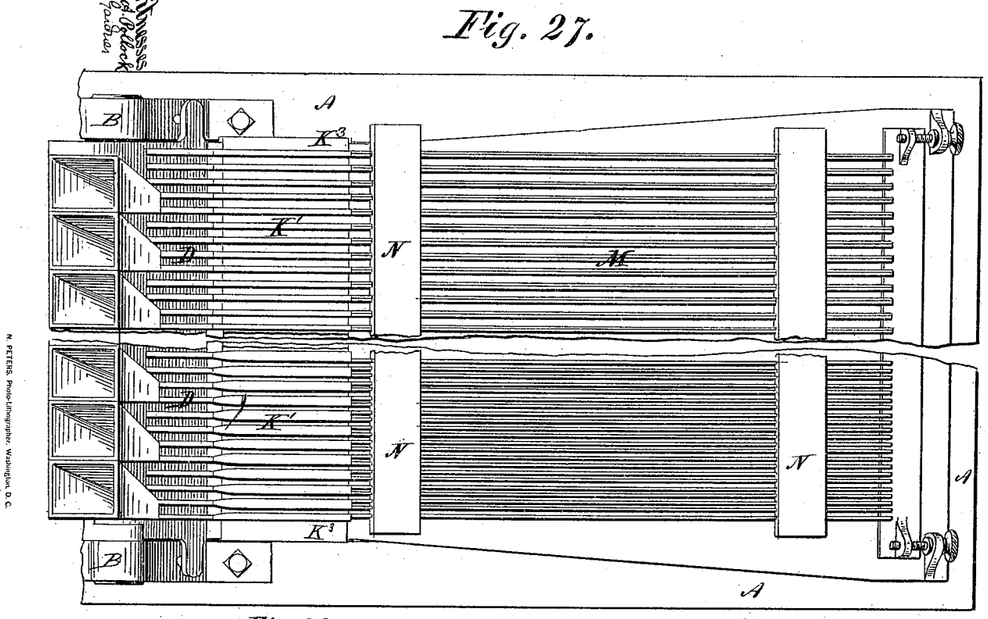
Fig. 27 is a plan of the right-hand side of the apparatus with the middle portion broken away, illustrating the use of the interchangeable system of intermediate type-channels and the space rods or bridges.
Figure 28:
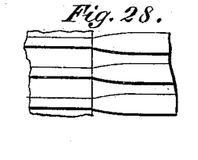
Fig. 28, a view on an enlarged scale of the adjoining edges or portions of the conduit-plate and intermediate type-channels, showing the flared entrances to the latter.
Figure 29:
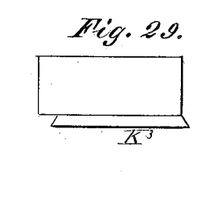
Fig. 29, an end view of one of the series of interchangeable channel-plates.
Figure 30:
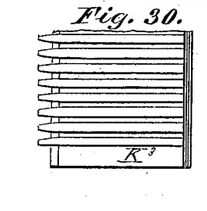
Fig. 30, a plan of one end of the same.

Heretofore we have allowed the types to drop from the conduit-plates D and E directly into the setter-channels M, and this may still be done in connection with our adjustable side walls. &c., upon the conduit-plates; but we prefer to arrange a series of primary or transfer channels, K K, upon the beds immediately underneath and in front of the conduit-plates, which shall be a permanent feature in the apparatus, and which shall serve simply as means of communication between the conduit-plates and the removable setter-channels M when the latter are in position upon the bed-plates I. By this means the setter-channels M are rendered entirely independent of the distributer, and may be removed and replaced without danger of interfering with the continuous distribution and descent of the types. The necessity of forming the ends of the setter-channels so as to adapt them to special devices in the distribution (as, for instance, in the present case, the type latching devices P Q) is also avoided, and their sides may be made perfectly plain and uniform throughout. These primary transfer-channels K may be made permanent upon the bed-plates I where the apparatus is to be used only for a single size of type, and for this reason in the drawings we have shown the side walls of the conduits upon the right-hand conduit-plate, D, and the side walls of their coinciding type-transfer channels K' as permanent in position; but by making the width of the conduits in the face of the conduit-plate equal to that of the largest types to be distributed, we are enabled, while still retaining the feature of permanent side walls in both conduits and transfer-channels, to adapt the side of the apparatus to the distribution of different sizes of types. This we accomplish by forming a suitable number of interchangeable plates, $K^3\,K^3$, corresponding to the different types to be distributed, to which plates the side walls of the intermediate transfer-channels are permanently affixed. These plates $K^3$ rest upon the inner ends of the bed-plates, which are grooved or depressed at this point to receive and hold them in such manner as to bring the bottoms of the transfer-channels even with the bottoms of the containing-channels. The width of the transfer-channels upon each of these plates is made to correspond to that of a particular size of type, and where such width is less than the width of the permanent conduits in the conduit-plate above, their side walls adjoining the latter are flared or beveled so as to connect with and form continuations of the side walls of the said conduits. This will be understood by reference to Figs. 27, 28, and 30. The upper half of Fig. 27 shows the containing or setter channels and the intermediate channels, K', of the same width as the conduits in the plate D, while the lower half of the figure shows the containing or setter channels and the intermediate transfer-channels, K' K', of a less width than that of the conduits $d$ in the plate D, such difference in width being compensated for by the flared ends of the transfer-channels. This gradual merging of one type-passage into the other is illustrated upon a larger scale in Fig. 28. By means of a series of interchangeable plates, $K^3 K^3$, thus formed with appropriate type-passages, the apparatus can be quickly and conveniently adapted to distribute types into setter or containing channels of any required size.

In the drawings the plates $K^3$ are beveled on each side so as to engage the sides of the dovetail groove $i^3$, formed in the bed-plate I I, which permits of their being slid in or out of place longitudinally; but where the use of such detachable parts would be objectionable by reason of the smallness of some of the sizes of types to be distributed, we prefer to form one side wall, $K^2$, of each of these intermediate typeways K, so that it will be adjustable laterally for the purpose of adapting the channels K to different widths of type. This construction is shown in the drawings in connection with the left-hand conduit-plate, E, it being understood that the same construction may be duplicated upon the right-hand side—that is to say, where the apparatus is to be used for various styles of types, the adjustments shown upon the left-hand side, may also be used upon the right-hand side, while, when the apparatus is designed for use only for a single size of type, or for a limited number of sizes of the larger types, the rigid construction shown upon the right-hand side will be formed upon both sides. Where one side wall $K^2$ of each channel K, is thus made adjustable the other walls are in each case permanent in position, and correspond to and coincide with the stationary conduit-walls $e$ upon the conduit-plate E.

The adjustment of the movable side wall, $K^2$, may be effected by various means, the construction shown in the drawings consisting in securing them all to a rod, L, underneath the conduit-plates D E, which rod is adjustable longitudinally in either direction. This longitudinal movement of the rod L may be effected by means of nuts $l\ l$, engaging screw-threads upon the rod, the nut upon one end being loosened, while the other is tightened, or vice versa, according to the adjustment desired, and the rod meanwhile being prevented from revolving upon its longitudinal axis by being feathered to the standards B, or by other well-known means. In the drawings the ends of the rod L are slotted longitudinally and pins $v$, pass through the standards and engage such slots.

Where the side walls of the transfer-channels K K are made adjustable upon both sides of the apparatus, the adjustable sides for both the coinciding right and left sides of the bank may consist of a single piece of metal of proper shape secured to and projecting laterally upon either side from the rod L, or other supporting device. This will be understood by reference to Fig. 3, in which the dotted lines $k^2$ complete the connection between the right and left side pieces. As shown in the drawings the adjustable side walls, $K^2$, are secured to the adjusting and supporting rod L by means of nuts $l'$ $l'$, which jam the plates $K^3$ between them.

If preferred, the adjustment of the side walls, $K^2$, of the intermediate channels, K, may be effected in the same manner as that of the side walls of the conduits upon the conduit-plate E, hereinafter described, or in any other convenient or desirable manner.

Figures 17, 18:
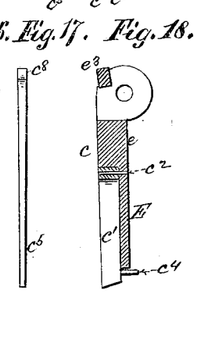
Fig. 17, a front elevation of the same.
Fig. 18, a detail section through one of the side walls of the conduits, showing the adjustable section thereof.

The side walls, $c'\ c'$, of the conduits $c$ in the plate E, which correspond to the adjustable sides $K^2\ K^2$ of the transfer-passages K K, are made movable, so as to permit their conforming in position to that of the said adjustable side walls, $K^2$, of the transverse passages. This adjustability of the side walls of the conduits $c$ may be effected in several ways. In the drawings the lower sections of the side walls, $c'$, are pivoted at points approximating those at which the respective receiving-plates F transfer the types into the conduits $c\ c$. As the receiving-plates are superposed, these pivotal axes will correspondingly be farther from or nearer to the lower edge of the conduit-plate E. It is desirable to preserve this arrangement, since thereby the types, being received into the full width of the conduits, are gradually and uniformly guided by the inclined adjustable sides $c'$ to the lowest and narrowest part of the conduit, bringing them into position to descend straightly and squarely into the transfer-channels K K. This form of construction will be understood by reference to Figs. 18 and 19, in which $c^2$ represents the pivots by which the movable sections $c'$ of the side walls, $e$, are secured to the plate E.

The position of the movable sections $c'$ of the conduit-walls $e$ is regulated by means of an adjusting device, O, upon the back of the plate E. This consists of a sliding plate, O, which is notched or recessed, as at $o'$, to receive the backward projections or pins $c^4\ c^4$, protruding from the lower portions of the movable sections $c'$. The plate O is moved longitudinally in either direction by stationary screws $e^2\ e^2$, which engage with female threads cut in the lugs $o^2$, projecting from the body of the adjusting-plate O.

The adjustment of the side walls, $c'$, may be effected by other means without departing from the scope of our invention in this respect—as, for instance, the lower ends of the adjustable sections $c'$ may be connected directly with the movable sides K' of the intermediate channels, K K, and the adjustment of both may thereby be rendered simultaneous.

The floors $c^5$ of the conduit $c$ are individually and independently adjustable. This adjustment of the conduit-floors also may be effected by other means than the construction shown in the drawings, as we believe ourselves to be the first to thus provide for varying the area of the conduits separately according to the thickness of the particular denominations of type which they are each designed to receive. A simple form of construction consists in mounting each floor-piece $c^5$ pivotally upon the cross-rod C, extending between the standards B, from which rod the two conduit-plates D E are also suspended.

Figure 1:
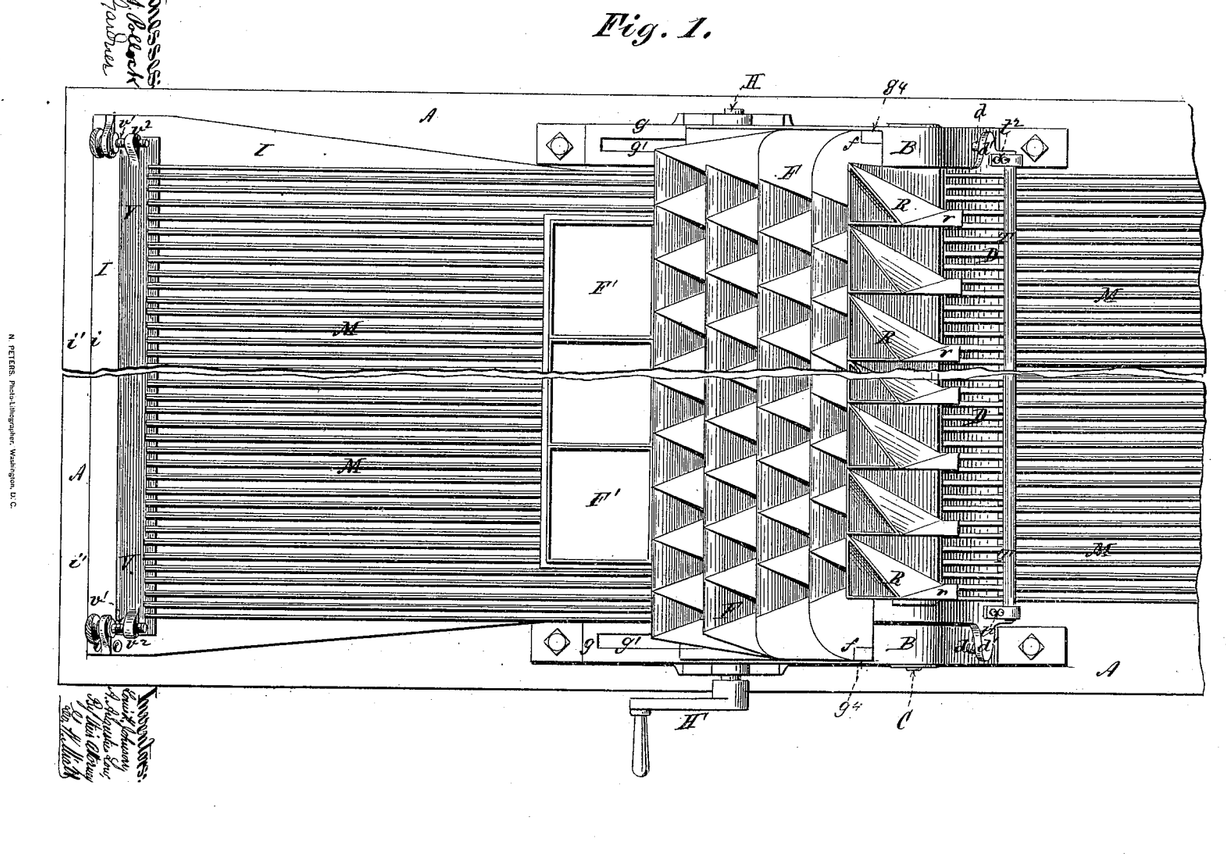
Figure 1 is a plan showing the receiving-surfaces or duplex bank and the general arrangement of our type-distributing apparatus, the central portion and the right-hand end of the table being broken away.
Figure 2:
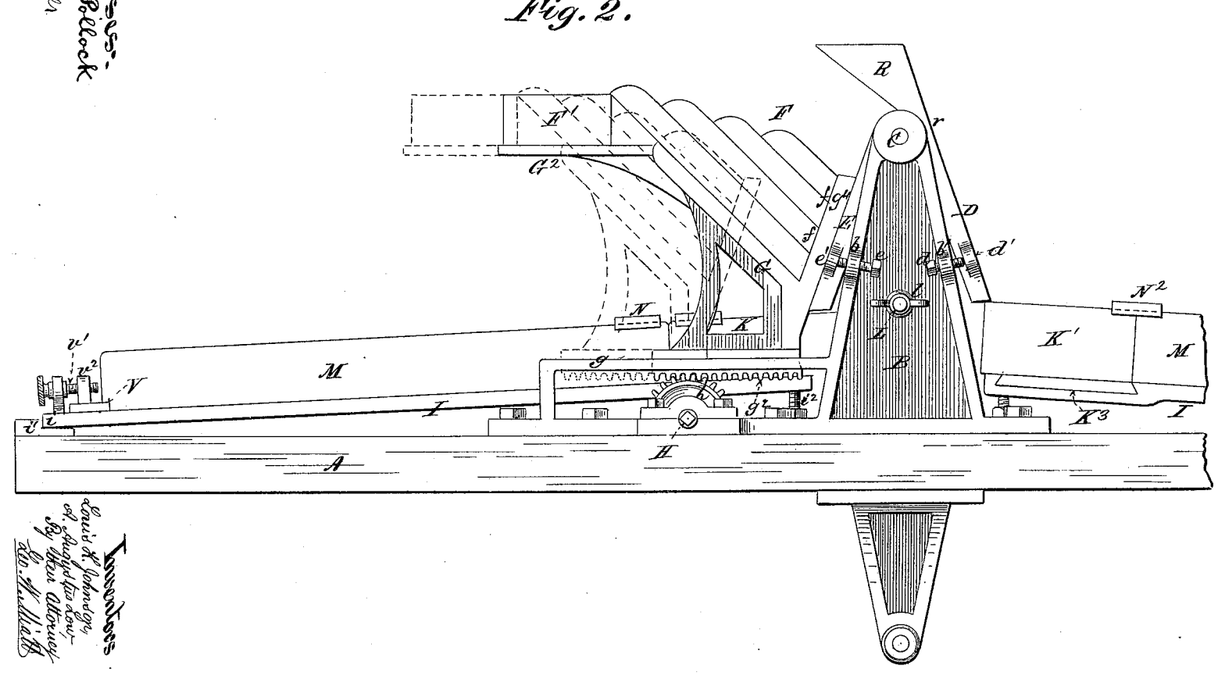
Fig. 2 is a side elevation of the portion of the apparatus shown in Fig. 1.
Figure 3:
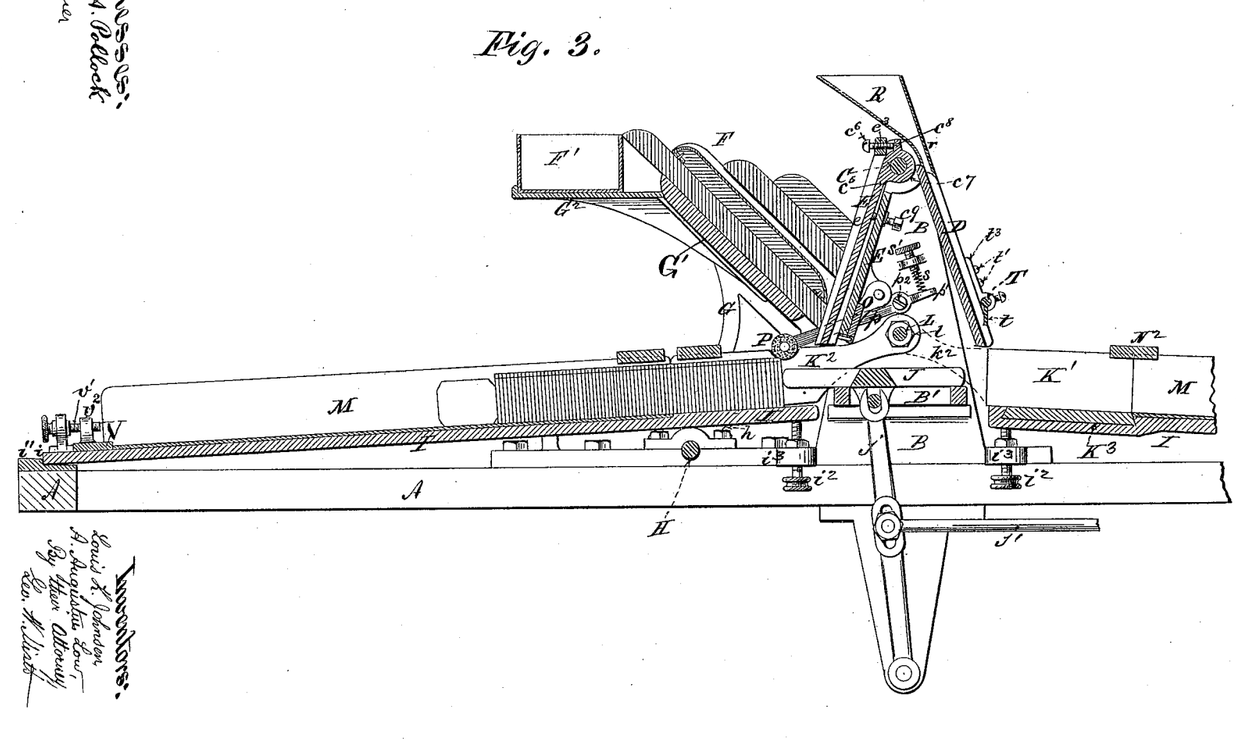
Fig. 3, a longitudinal section through the same.
Figure 19:
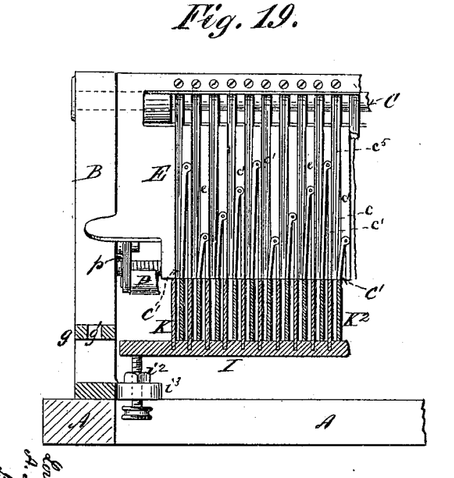
Fig. 19 is a sectional view of one side of the type-channel bed, showing one end of the left-hand conduit-plate in elevation.

From the cross-rod C the floors extend down in front of the body of the conduit-plate F, and between the conduit side walls formed thereon, as will be seen by reference to Figs. 3 and 19. The width of the floor-pieces contracts gradually and uniformly from the fullest width of the conduits at or near the top to a width equal nearly at their lower ends to that of the smallest type to be distributed in the apparatus. This is for the purpose of allowing the full degree of movement to the adjustable sections $e'$ of the conduit side-walls, $e$, without regard to the positions of the floor-pieces $c^5$. The latter are held in the desired position within their respective conduits by set-screws $c^6$. These set-screws $c^6$ may project from some portion of the conduit-plate E and bear against opposed portions of the floor-pieces. Thus the bar $e^3$, extending along the top of the conduit-plate E, has a series of set-screws, $c^6$, passing through it and projecting more or less in front of the contact-lugs or bearing-surfaces $c^8$, formed upon the heads $c^7$ of the floor-pieces $c^5$. This construction is convenient in that it admits of the adjustment at all times of any of the floor-pieces from the front of the conduit-plate E without disturbing any of the other parts. If preferred, however, the set-screws $c^6$ may simply pass through the back of the conduit-plate, as indicated at $c^9$ in Fig. 3, and act as back-rests to the floor pieces.

It will be seen that by thus providing for the adjustment of both the floors and the side walls of the conduits, we are enabled to contract the area of each conduit at its lower end so that it shall be as nearly equal the actual area in cross-section of the types designed to be passed through as is desirable, thus perfectly controlling each type at the most critical point of its passage through the apparatus—namely, upon departure from its conduit into its containing-channel underneath. In other words, the perfect alignment of each type as it enters its containing-channel is positively assured.

Having thus attained the proper presentation of the types into the receiving-channels, the next feature of our invention is to provide means for maintaining them in such position. This we accomplish by the use of what may be designated as our "type latches" or "retainers" P and Q. The first of these, P, consists of guard rails or rollers extending over the entire series of type-channels immediately in front of the lower ends of the conduits. These guards P allow the faces of the types to pass underneath them when forwarded by the pusher and then drop down behind them sufficiently to check any tendency to return with the retractile movement of the pusher. For the purpose of avoiding injury to the faces of the types, the retaining-guards P are preferably faced with soft rubber, cloth, or other yielding or elastic material, and are also preferably made in the form of rollers which are free to revolve upon their axes.

Figures 20, 21, 22, 23, 24, 25, 26:
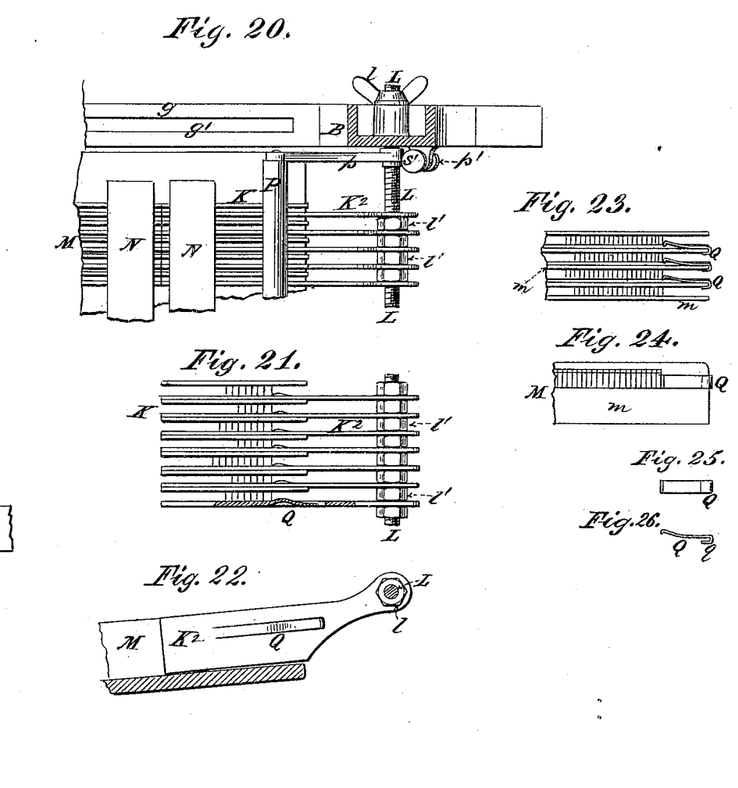
Fig. 20 is a top view of a portion of the apparatus, illustrating the arrangement of the intermediate type-passages and the check-roller, &c.
Fig. 21 is a detached top view of several of the intermediate transfer-passages provided with type latches or steadiers.
Fig. 22, a side view of one of the adjustable side walls of the intermediate transfer-channels formed with a spring type latch or steadier.
Fig. 23, a top view of the receiving ends of several adjoining type-containing channels provided with detachable lateral type latches or steadiers.
Fig. 24, a side elevation of one of the same, showing the short wall of the channel and the position of the detachable type latch or steadier.
Figs. 25 and 26, respectively, side and edge views of one of such lateral type-latches.

In lieu of such soft or elastic surfaces, they may be provided with bristles, like a brush, which will give way before the advance of the types impelled by the pusher, and will then spring into position behind the types. In this latter case the guards may be made stationary, if preferred. In any case, the retaining guards P are mounted between suitable bearings upon opposite sides of the table. Such bearings may project upward from the bed-plate I, or may consist of suspension-levers $p$, pivoted to the standards B. In such case the guards tend downward by their own gravity, and for the purpose of regulating this downward pressure, so as to allow the types to pass underneath without undue friction, we counterbalance the weight of the guard and levers $p\ p$ more or less by means of an elastic pressure applied either to the under sides of the suspending-levers $p\ p$ or to the upper sides of the extensions $p'\ p'$ beyond the fulcrums $p^2$ upon the standards B B. In the drawings this elastic tension is afforded by spiral springs $s$ interposed between the extension $p'$ of the suspending-levers $p$ and the set-screws $s'$ passing through lugs or bearings upon the standards B. By this arrangement the guard P may be regulated so as to work with such delicacy as to obviate all danger to the faces of the type. In addition to this top guard, P, which steadies the upper ends of the types and will in many cases, as with the larger types, be sufficient to prevent the types from falling back, we also use side latches, Q, which bear against the edges of the types as forwarded by the pusher, and thus hold them laterally against displacement. These lateral latches may be provided upon one or both sides of the type-channels, although ordinarily their use upon one side will be sufficient, and they may be arranged at different points along the channels to preserve the positions of the types in a column of considerable length. They may be formed directly from and in the side walls of the channels, as shown in Figs. 21 and 22, or may be attached thereto or supported thereon in any convenient manner, the essential feature of our invention in this connection being elastic surfaces interposed slightly into the path of the types upon one or both sides of the type-channels either in the portions of the latter in which the types are raised and forwarded by the pusher or along the path of the types, which elastic surfaces are free to yield before the advance of the types, while at the same time exerting a lateral pressure thereon that tends to preserve them in their upright position within the channels.

Ordinarily a slight convexly-curved surface imparted to the inner side of the flat spring Q will be sufficient to sustain the types; but they may be formed with shoulders which will spring in behind the types when fully raised by the pusher, thus making their action positive. This will be desirable only in connection with the smaller sizes of types in which, owing to bent types in the column, there might be more or less back-pressure, as hereinbefore described. This positive construction of the latches here referred to is illustrated in Figs. 23 and 24 and 31 and 32, and the engagement of the retaining-shoulders with the types will be understood by reference more especially to Fig. 31. These lateral latches may be applied either to the intermediate transfer-channels, K, or, where the latter are not used, directly to one end of the ordinary setter-channels, when the latter are placed to communicate directly with the conduit-plates, as in our former applications for patent. When used in connection with the said setter-channels, and for the purpose of obviating the necessity of any change or alteration therein, we design to make the spring-latches separate, and to simply place them in position at the ends of the channels, with their lower edges resting against the upper edges of the shorter wall of the type-channel, and their ends clasping or shouldered against the ends of the walls of the next adjoining channels. This method is illustrated in Figs. 23, 24, 25, and 26, in which the short walls $m$ of the channels M are shown as exposing the bodies of the types sufficiently to allow the latch Q to come in contact with them when placed in the spaces above the said shorter wall. The elastic latches thus occupy a position between the types and the adjoining high walls of next channel, and by being compressed between them exert sufficient pressure to hold the types upright.

Figure 31:
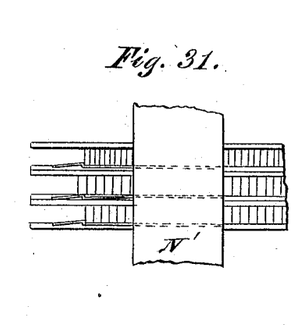
Fig. 31, a plan upon an enlarged scale of portions of three adjoining type channels connected by a space rod or bridge, to which are secured lateral type-latches for each channel.
Figure 32:
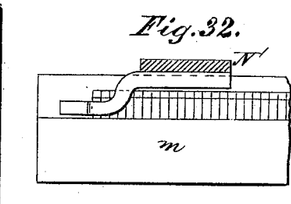
Fig. 32, a side elevation of the portion of one of the type channels shown in Fig. 31, showing the space rod or bridge in elevation, and the relation of the lateral type-latch to the shorter wall of the channel.

In order to prevent their moving along the channels with the types, the springs Q are formed with shoulders $q$, which engage with the ends of the channels; or in lieu of this the bridge N', provided with the necessary lateral latches, may be used near the ends of the setter-channels, as shown in Figs. 31 and 32. This latter construction is also especially adapted for use at different points along the channels in assisting in holding and forwarding the columns of type.

For the purpose of steadying the outer ends of the transfer-channels K, and for preserving the relative positions of the type-setter channels M, we use space bars or bridges N, the under sides of which are formed with grooves $n$ for the reception of the upper edges of the side walls of the channels. The projection of the under sides of the space-bars into the type-channels is not sufficient to interfere with the passage of the types underneath.

Where the apparatus is adapted to the distribution of types of different sizes, &c., a series of these space-bars is provided, the grooves in each of which correspond to the adjustment of the side walls of the type-passages for a particular size of type.

The under sides of some of the space-bars are provided with the tongues $n'$, which enter into the spaces formed between the side walls of adjoining channels when the latter are arranged for small sizes of types. This construction is shown in Fig. 9.

Where the intermediate transfer-channels, K, are used in connection with the ordinary setter-channels, as in the drawings, the space-bars N may be used as couplings between the adjoining ends of the said channels, as shown at $N^2$, Fig. 3, thus perfecting and preserving their alignment. The use of these space bars or bridges enables us to form the type-channels, when desired, of plain strips of metal resting upon a flat bed surface, as will be understood by reference to Figs. 11 and 12, or one side may be permanently attached to the bed-plate, while the other is removable, as would be the case in Figs. 9 and 10.

Upon the right-hand conduit-plate, D, we arrange a series of funnel-shaped receivers, R, which project over the apex of the duplex bank, so that their mouths are brought in proximity to the receiving-plates F, upon the left-hand side of the bank. The upper walls of these receiving-funnels R incline and converge into the narrow throats $r$, which are of sufficient area only in cross-section to allow the passage of the types with their flat or broad sides resting upon the floors or bottoms of the receivers, which floors are simply continuations of the floors of the conduits underneath. Owing to the width of the funnels R only a certain number of the conduits can be so provided with enlarged entrances, and these are devoted to the types among those distributed upon that side of the bank, which are the most frequently used. The rest of the conduits upon the right-hand plate, D, (those intermediate between the receiver R,) not being provided with the enlarged receivers R, on account of the space necessarily occupied by the latter, are nevertheless utilized for the reception of the less frequently used types, which are deposited into their upper or receiving ends in the same manner shown and described for the corresponding right-hand conduit-plate in our Patent No. 337,406, March 9, 1886, consequently there is no loss or waste of space by reason of the employment of the enlarged receivers R, which extend above and do not prevent access to the mouths of the intermediate conduits, which latter are provided with the full complement of type-containing channels M below for the reception of the types deposited in their narrow upper receiving ends.

Upon the right-hand conduit-plate, D, we also provide a type-guard, T. This guard is formed with the projecting tongues $t$, which are made to enter the conduits more or less for the same purpose, and by means similar to those shown and described in previous applications. The guard T is secured to the conduit-plate D by set-screws $t'$, which pass through the bearings $t^3$, or in any other convenient manner.

The setter channels M rest at their outer ends upon a step or shoulder, V, extending across the end of the bed-plate I. This step V is adjustable upon the bed in the direction of the receiving-bank, so that the setter channels may thereby be locked or held firmly in position upon the bed I, with their inner ends resting against the ends of the transfer-channels K, or against the usual shoulders or steps otherwise provided upon the bed when the intermediate transfer-channels, K, are not employed.

The adjustment of the step V is attained by any desirable means, that shown in the drawings consisting of stationary screws $v'\ v'$, secured to the bed I, and engaging female screw-threads formed in the lug-nuts $v^2\ v^2$, projecting from either end of the step V.

What we claim as our invention, and desire to secure by Letters Patent, is—

1. In type-distributers substantially such as herein designated, the bed-plate for the reception and support of the type-containing channels, adjustable vertically with relation to the lower edges of the conduit-plates, substantially in the manner and for the purpose described.

2. In a type distributing apparatus substantially such as designated, the combination, with a series of movable type-receiving plates above and a series of type-containing channels below, of the intermediate connecting conduit-plates pivotally suspended upon the frame of the apparatus and adjustable in inclination thereon, substantially in the manner and for the purpose described.

3. In a type-distributing apparatus substantially such as designated, the combination and arrangement, substantially as herein set forth, of the vertically-adjustable bed-plates which support the containing-channels with the conduit-plates, which are adjustable in inclination, whereby the relative positions and distances between the adjoining parts may be maintained, substantially in the manner and for the purpose set forth.

4. A conduit-plate formed with type-conduits, the floors of which are independently adjustable for the purpose of regulating the depth of the conduits, substantially in the manner and for the purpose described.

5. In a type-distributing apparatus substantially such as described, the combination, with a series of superposed retractable receiving-plates above and a series of containing-channels below, of an intermediate connecting conduit-plate formed with type-conduits, each of which is provided with an adjustable side wall, for the purpose and substantially in the manner set forth.

6. A conduit-plate formed with type-conduits, each of which is formed with an adjustable side wall and an adjustable floor, for the purpose and substantially in the manner described.

7. In a type-distributing apparatus substantially such as designated, a series of intermediate transfer-channels arranged upon the channel bed-plate and interposed in position thereon between the lower ends of the conduit-plates and the position of the setter or type-containing channels, in combination with the said conduit-plates and setter or containing channels, and with the vibrating type-forwarder, for the purpose and substantially in the manner described.

8. In a type-distributing apparatus substantially such as designated, a series of intermediate transfer-channels, each formed with an adjustable side wall and arranged upon the channel bed-plate and interposed in position thereon between the lower ends of the conduit-plate and the position of the setter or containing channels, in combination with the said conduit-plates and setter or containing channels, and with the vibrating type-forwarder, for the purpose and substantially in the manner described.

9. The horizontal check-guard extending over the top of the type-channels in front of the conduit-plate and near the termination of the stroke of the pusher, and arranged and operating substantially in the manner and for the purpose described.

10. The horizontal check-guard arranged and operating over a series of type-channels, substantially as set forth, formed with a contact-surface of soft rubber, cloth, bristles, or other elastic or yielding material, for the purpose described.

11. The horizontal check-guard arranged and operating over a series of type-channels, substantially as herein set forth, mounted between bearings which are provided with means for counterbalancing and regulating the downward pressure of the said guard, substantially in the manner and for the purpose described.

12. A lateral type-latch or bearing-surface arranged at the side of a type-channel near its receiving end and in such relation to the vibrating pusher that it presses against and holds the types as they are raised and forwarded by the pusher, substantially in the manner and for the purpose described.

13. The adjustable step or bearing upon the bed-plate for the outer ends of the setter type-channels, arranged and operating substantially in the manner and for the purpose described.

14. The movable standards upon and between which the superposed receiving-plates are supported, said standards resting upon suitable rails or ways upon the frame, and being formed with rack-teeth, which engage gears upon a common shaft, mounted in suitable bearings upon the frame and formed to receive a crank-key, or other means imparting motion to the gears, for the purpose of moving the receiving-plates, substantially in the manner and for the purpose described.

15. In combination with the side walls of the type-channels herein described, the space bars or bridges formed upon their under sides, with grooves for engagement with the side walls of the said channels, for the purpose and substantially in the manner described.

LOUIS K. JOHNSON.
A. AUGUSTUS LOW.

Witnesses:
PAUL H. BATE,
GEO. W. MIATT.